United States Patent [19]
Marquardt

[11] 4,434,057
[45] Feb. 28, 1984

[54] WATER PURIFICATION UTILIZING PLURAL SEMIPERMEABLE MEMBRANE STAGES

[75] Inventor: Kurt Marquardt, Holzgerlingen, Fed. Rep. of Germany

[73] Assignee: Hager & Elsasser GmbH, Stuttgart, Fed. Rep. of Germany

[21] Appl. No.: 347,684

[22] Filed: Feb. 11, 1982

[30] Foreign Application Priority Data

Feb. 16, 1981 [DE] Fed. Rep. of Germany ....... 3105550

[51] Int. Cl.³ ............................................. B01D 13/00
[52] U.S. Cl. .................................... 210/638; 210/639; 210/652; 210/669; 210/673; 210/677; 210/774; 203/39; 203/71; 203/DIG. 16; 204/98; 204/129; 204/180 P; 204/186
[58] Field of Search ............... 210/638, 639, 641, 644, 210/652–655, 669, 673, 677, 774, 805, 806; 204/180 P, 180 B, 186, 98, 128, 129, 180 R; 203/39, 71, DIG. 16

[56] References Cited

U.S. PATENT DOCUMENTS

| | | | |
|---|---|---|---|
| 3,547,810 | 12/1970 | Cooper | 204/180 B X |
| 3,639,231 | 2/1972 | Bresler | 210/638 |
| 3,823,086 | 7/1974 | Schmidt | 210/638 |
| 3,962,077 | 6/1978 | Pascarella et al. | 210/641 X |
| 4,141,825 | 2/1979 | Conger | 204/180 P |

FOREIGN PATENT DOCUMENTS

2428562 5/1980 Fed. Rep. of Germany ...... 210/641
3041209 5/1982 Fed. Rep. of Germany ...... 210/641

OTHER PUBLICATIONS

Perry; R. H. et al., Chemical Engineers' Handbook, McGraw-Hill Book Co., N.Y., Fifth Edition, 1973, pp. 11–27 to 38 and 19–26 to 33.
Meinck; F. et al., Industrie-Abwasser, Gustav Fischer Verlas, Stuttgart, 1968, pp. 147–149.

Primary Examiner—David R. Sadowski

[57] ABSTRACT

The treatment of raw water, particularly the desalination of waste or other water with a high salt content, is accomplished by means of a process which includes two membrane separation steps performed in concentrate sequence. The concentrate from the second membrane separation step is further treated by means of a thermal concentrating procedure. The water to be processed is first treated to minimize the formation of scale during the first membrane separation step and the concentrate from the first membrane separation step is similarly treated. The overall process also includes the production of materials necessary for reconditioning ion exchange apparatus employed for raw water conditioning and concentrate treatment.

27 Claims, 8 Drawing Figures

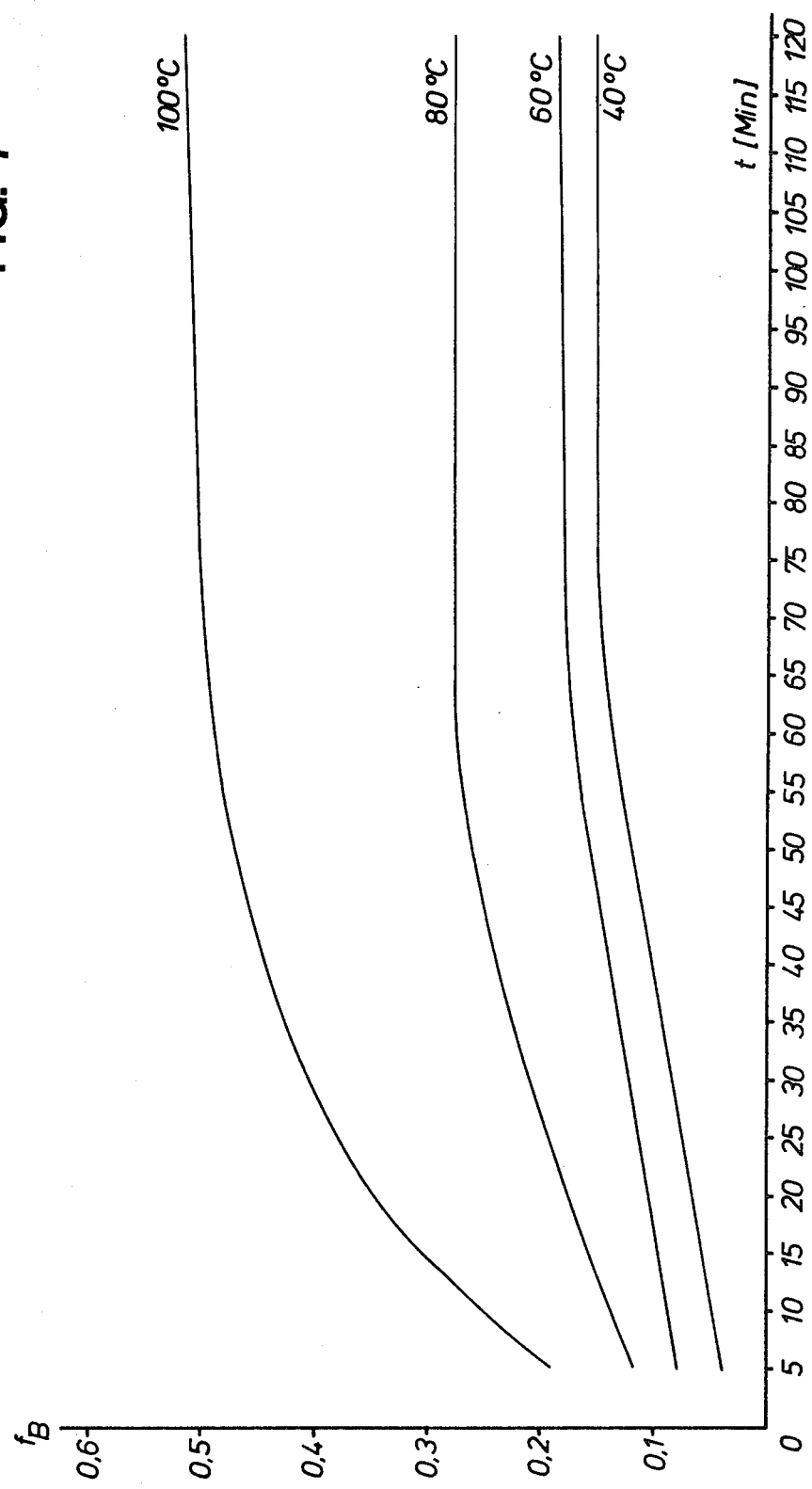

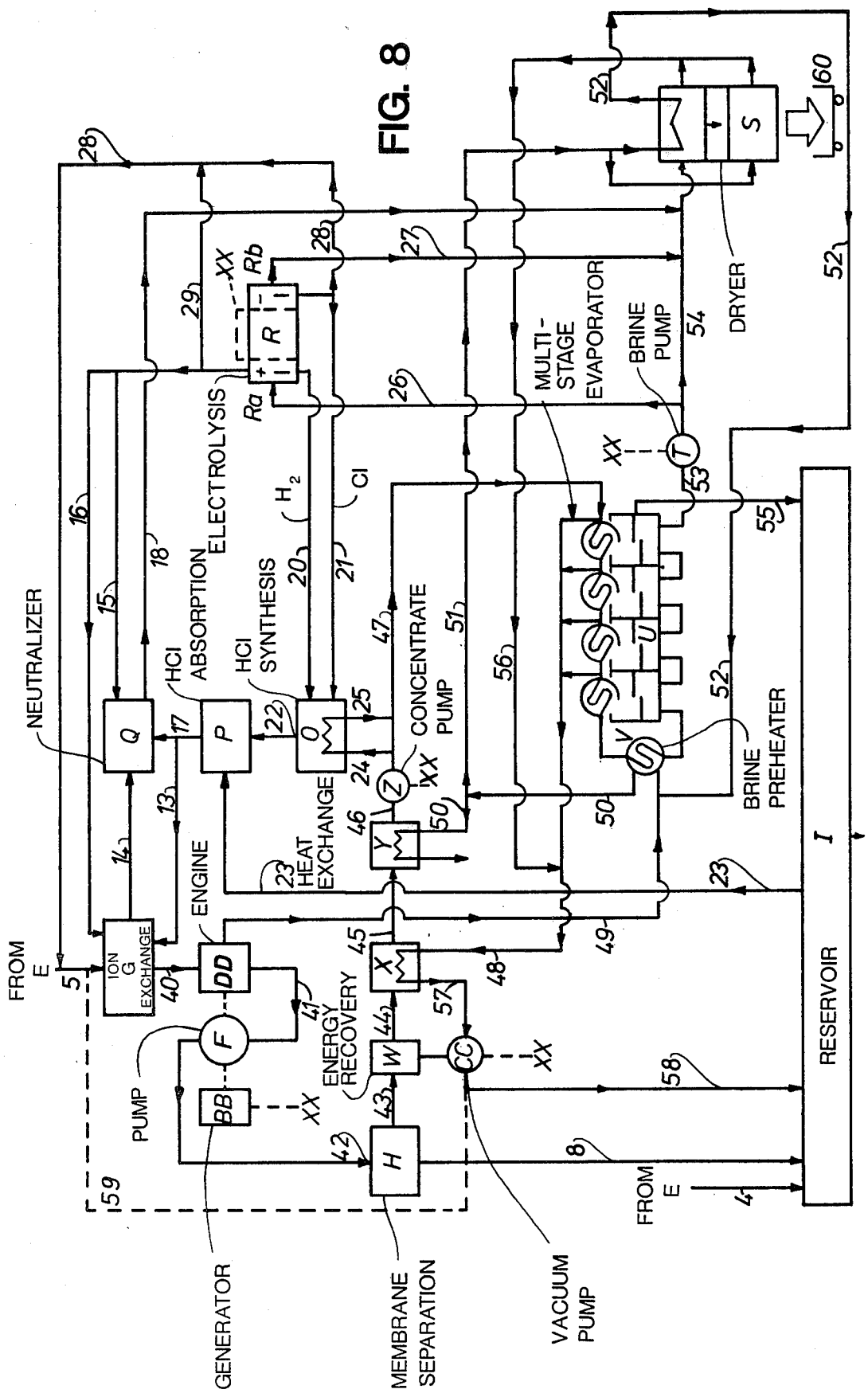

WATER PURIFICATION UTILIZING PLURAL SEMIPERMEABLE MEMBRANE STAGES

BACKGROUND OF THE INVENTION (1) Field of the Invention

The present invention relates to water treatment and particularly to processes for converting sea, brackish, waste or otherwise impure water into water suitable for drinking and general usage while refining the concentrates and sediments resulting from the treatment. More specifically, this invention is directed to liquid treatment systems employing at least two membrane separation stages connected in concentrate sequence and especially to such systems wherein the concentrate produced by the last membrane separation stage is subjected to a thermal concentration step. Accordingly, the general objects of the present invention are to provide novel and improved methods and systems of such character.

(2) Description of the Prior Art

The use of membrane separation processes, such as reverse osmosis and electrodialysis, for the desalination of fresh water, brackish water, sea water and waste water is known in the art. Such processes have been found to be particularly well suited for use in the desalination of low salt content brackish water. In the prior art the achieveable product yield of a membrane separation process has been found to be limited by the materials contained in the water to be treated which, during the concentration process, exceed their solubility limit and thus precipitate out of solution. In other words, the achieveable product yield is not limited by the osmotic pressure of the concentrate. Accordingly, a problem known in the art as "membrane scaling", resulting from the precipitated deposits which form on the membrane, arises and these deposits have a negative influence on both the permeate flow and the salt retention characteristics of the membranes. In order to reduce "membrane scaling" in a desalination process, it is common practice to pretreat the "raw" water prior to its delivery to the desalination unit. Thus, by way of example, if carbonate hardness is the limiting factor in the formation of precipitates, acid will be added to the raw water and the carbonate hardness will be converted to non-carbonate hardness. Similarly, if there is a risk of calcium sulfate precipitation at the chosen concentration or permeate yield, it is necessary to reduce the calcium content of the "raw" water either by means of an ion exchange process or by causing a sufficient degree of chemical precipitation to permit obtaining the desired product yield. A further approach to preventing or minimizing "membrane scaling" is to delay precipitation by stabilization of the scale-causing compounds thereby achieving an improvement, albeit a very limited improvement, in the degree of concentration which can be achieved.

It is also to be noted that prior desalination processes employing membrane separation have typically called for the concentrate, which was produced by a single membrane separation unit, to merely be discarded. However, with very unfavorable "raw" water conditions, it becomes necessary to conduct the entire input quantity of "raw" water through an ion exchanger or a chemical precipitation reactor. If the concentrate produced by a single-stage membrane separation unit is discarded, dependent upon the product yield obtainable in such unit, a quantity of "raw" water which amounts to up to three (3) times the obtainable product yield must be treated by precipitation or ion exchange.

If an anion exchange step is performed, a weakly basic anion exchanger in chloride form is added to the "raw" water. This anion exchanger absorbs sulfate and releases chloride into the solution. While such an anion exchanger can be regenerated with the brine from a subsequent desalination step, it is necessary, either in the charging cycle or during regeneration, to add acid in order to obtain a sufficiently high sulfate capacity of the anion exchange resin. Further, and in any event, the useable volume capacity of a weekly basic anion exchange resin is only 1.2–1.6 $val/l_A$. Capacities in the range of 2–2.5 $val/l_A$ may be achieved through the use of a weak acid cation exchanger which reduces the concentration of alkaline earth ions to a desired minimal value. However, the cation exchanger resin must be regenerated with hydrochloric acid and caustic soda. Regeneration with a sufficiently high quantity of acid is especially important in order to obtain the smallest possible calcium concentration in the softened water being produced. The use of a weak acid cation exchanger has been impeded because the neutral salts from the brine of a desalinizer can not be used directly for regeneration of the resin.

The high pressure pumps necessary to drive a reverse osmosis device are often driven by diesel engines. This is particularly true in oil producing countries where inexpensive fuel is available. The thermal energy produced in the burning of the fuel is converted, with about forty-one (41%) percent efficiency, into mechanical energy which can be applied to the desalination process. Of the remaining energy, approximately twenty-eight (28%) percent is used in the cooling of the desalination apparatus with water or air, approximately twenty-four (24%) percent is lost in the exhaust and the remainder is lost through other causes. Thus, prior reverse osmosis desalination techniques have, taking into account the losses, been characterized by inefficiency.

It is also noteworthy that the concentrates produced by the membrane separation unit of prior desalination systems have either been discharged into nearby surface waters, such as rivers, lakes or the ocean, or permitted to seep into the ground. These concentrates have a very high salt-content and thus their discharge into the environment presents the danger of salination of the surface waters or ground water. Accordingly, to the extent not already required, the controlled removal of such high salt content solutions will become mandatory in the near future. Thus, considering the operation of a desalination installation, the amount of concentrate produced will have to be substantially reduced in order to minimize the cost of transportation of the high salt content liquid waste to an appropriate disposal site or all of the salts in the concentrate will have to be converted to solid form.

It is noted that membrane separation processes, and especially reverse osmosis, are more energy efficient than alternative processes such as evaporation in, for example, the desalination of sea water. In a desalination process, depending on the salt content of the "raw" water, the osmotic pressure of the concentrate may reach a level of 60 bar. At present, the maximum operating pressure of a reverse osmosis system is 70 bar and, with a high salinity solution being treated, the maximum product yield will be forty (40%) percent. Concentrates produced in the desalination of waste water and brackish water using membrane systems with high product yields show salt content similar to that resulting from the desalination of sea water. The relatively large quantity of water discharge inherent in the above-discussed operating conditions is, accordingly, a significant limitation on the use of membrane technology. Thus, additional processes stages are necessary to further treat the concentrate so that the systems can be economically operated beyond the salinity limits of the reverse osmosis process. In an evaporation process the limiting factor on product yield is not the salinity of the concentrate or its osmotic pressure, but the risk of forming deposits on the heat exchanger surfaces as a result of precipitation of materials during concentration. This is a chemical problem which can be solved by suitable pretreatment thus enabling the preparation of high salinity solutions with evaporation systems.

The permeate obtained with prior membrane desalination installations is normally not of drinking water quality. Thus, the permeate will typically have an excess of sodium salts and carbonate deficiency. Also, the total salinity of the permeate is often too low. In order to increase the "hardness" of the permeate, it is often dosed with carbon dioxide and/or passed through a deacidifying filter including dolomite material or lime water is added to the permeate stream. The addition of carbon dioxide results in the alkaline calcium compounds being converted to calcium carbonates. In many cases the carbon dioxide is extracted from the air or produced by burning a fuel, this being particularly true in the less industrialized countries. This, of course, further increases the cost of the water treatment apparatus and system operation.

SUMMARY OF THE INVENTION

The present invention overcomes the above-discussed and other deficiencies and disadvantages of the prior art by providing a novel and economical water treatment process characterized by an increase in yield and a reduction in energy comsumption and raw material requirements. The present invention also encompasses apparatus for use in the practice of this novel process, the said apparatus being characterized by two membrane separation stages connected in concentrate sequence.

In accordance with the present invention "raw" water is pretreated before delivery, by means of a high pressure pump, to a first membrane separation stage. This pretreatment preferrably comprises merely a simple conditioning process such as acid and stabilizer addition. The concentrate produced by the first membrane separation stage is subjected to a further treatment step which may consist of ion exchange or chemical precipitation. After such further treatment, the water from the first membrane separation stage concentrate is delivered to a second membrane separation stage. The concentrate from the second membrane separation stage is delivered to a thermal concentration stage. The heat necessary to operate this thermal concentration stage may be produced by any or a combination of collectors of solar energy, extraction from cooling air, extraction from exhaust gases from internal combustion engines or extraction from externally available heat-containing gases.

Also in accordance with a preferred embodiment of the present invention, caustic soda is produced by electrolysis of the concentrate stream of the membrane separation stages. Also, hydrochloric acid is produced by a synthesis process with the requisite chlorine and hydrogen gas being derived from the anode and cathode regions of the hydrolysis apparatus. The hydrochloric acid and the caustic soda thus produced are used for regeneration or conditioning of an ion exchanger employed for the removal of scale forming ions in the influx to the system and/or employed for treatment of the concentrate of the first membrane separation stage.

Thus, further in accordance with a preferred embodiment of the present invention, the concentrate produced by the first membrane separation stage, and/or the influx to this stage, are subjected to an ion exchange process which employs a thermically regenerable ion exchange resin. The exchange resin is chosen such that it selectively removes bivalent ions from the fluid substream while monovalent ions will pass through the ion exchange conditioning stage uneffected.

The present invention also contemplates the generation of the carbon dioxide necessary for the further treatment of the products produced in a desalination installation by means of thermal disassociation of the sodium bicarbonate which is available in the concentrate of the membrane separation stages. This thermal disassociation must be performed at a temperature of at least 40° C. and through the use of a weakly acid cation exchanger as a conditioning or concentrate pretreatment process. The thermal energy for the thermal disassociation of sodium bicarbonate may be derived from cooling air and the exhaust of a combustion engine employed to drive the high pressure pump which delivers the "raw" water to the first membrane separation stage. Alternatively, the thermal energy may be extracted from externally available exhaust or other hot gases.

A further feature of the present invention is the use of desalination units, in the first membrane separation stage, which have an operating pressure of 20-40 bar and a pass rate of salt in the range of 5-20%. The desalination units of the second membrane separation stage will have an operating pressure in the range of 50-100 bar and salt pass rate in the range of 0.5-5%.

In accordance with the preferred embodiment, the concentrate produced by the second membrane separation stage is further concentrated by means of a single evaporation stage which comprises a forced evaporation apparatus. This technique results in the crystallization or conversion to solids of salts in the said concentrate and these solid materials are separated onto cascaded wood or plastic materials or rock slag which are removed from the system and replaced when a predetermined level of deposits have formed thereon.

It is also within the contemplation of the present invention to treat the concentrate of the second membrane separation stage by means of a two-step evaporation process. In the first step the amount of water removed is controlled such that no crystallization or precipitation occurs. In the second step, which is performed in the presence of replacable elements on which deposits will form, the concentrate is further concentrated to the point of crystallization, precipitation or dryness. The two-step evaporation is produced through the use of hot gases which are delivered to the evaporation apparatus as dictated by the thermal requirements of each step.

It is possible, in accordance with the present invention, to connect the stages of the two-step evaporation process in series with the hot gas employed to cause evaporation flowing in the opposite direction with respect to the direction of flow of the concentrate. If the concentrate is to be treated in a single-stage forced evaporation reactor, a counter-flowing hot gas/concentrate arrangement will be created and the gases will be introduced into the reactor tank simultaneously through one or more distributors and water vapor containing heating gases, appearing at the head of the reactor, will be passed over a cooled condensation surface. The thus separated low-salt content water (condensate) will be collected in a channel for utilization.

The present invention also contemplates, in accordance with one embodiment, the passing of the concentrate of a membrane desalination unit into a multi-stage evaporator and, optionally, an evaporative dryer. The concentrate produced by the membrane separation stages will be preheated using the exhaust gases of the drive engine for the high pressure pumps of the membrane separation stages as the energy source. The same source of thermal energy may be employed for heating the evaporative dryer and available spent steam may be employed to operate the multi-stage evaporator. Various other arrangements are also possible such as, for example, employing the vapors eminating from the multi-stage evaporator and the evaporative dryer, possibly together with steam, to preheat the concentrate of the membrane separation stage. It is also possible to employ the coolant for the pump drive engine as a source of thermal energy to preheat the input flow to the membrane separation process. It is additionally possible to mix the product of the membrane separation stages, the condensate from the multi-stage evaporator and the vapor condensate of the evaporative dryer in appropriate proportions to produce water of sufficiently good quality to be used for drinking or other purposes.

The present invention further contemplates the use of a forced evaporation reactor which is open at the top and which is equipped with cascaded, perforated plates, a screen or bottom insert, and which has a ring-shaped sloping metal cover with a central opening.

To summarize the present invention, a pair of membrane separation units are utilized in the treatment of "raw" water. The inlet flow to the first of these separation units and the concentrate produced by this first membrane separation unit are conditioned to minimize scale formation on the membranes of the separation units. Further, waste heat is employed to perform multi-stage or forced evaporation of the concentrate of the membrane desalination stages as well as to produce operating materials for the conditioning of the "raw" water and/or for treatment of the concentrate of the first membrane unit.

The present invention has, as an important attribute, a significant improvement in the product yield by comparison with the yield normally obtainable employing a membrane separation unit alone.

Another important attribute of the present invention is a substantial reduction in energy consumption. This benefit is, in part, attributable to the higher product yield since, with increased yield, the volume of "raw" water entering a desalination installation may be reduced and thus the feed mechanisms, such as the high pressure pumps, will have a lower power consumption.

The present invention is also characterized by an important reduction in the chemical requirements for conditioning and chemical precipitation. To prevent scaling in the membrane separation units, the entire inlet volume delivered to apparatus for practicing the process of the present invention must be pretreated. Obviously, the smaller the input volume and the higher the product yield, the less chemicals are required. Also, a chemical processes, such as chemical precipitation, is preferrably first applied in the treatment of the concentrate of the first membrane separation unit where the quantity of material to be treated is comparatively small. This results in a further significant reduction in chemical costs compared to the use of chemical precipitation in the inlet flow to the entire installation.

Apparatus and processes in accordance with the present invention are additionally characterized by a reduction in the power requirements of the installation and in the volume of the conditioning and precipitation processes. Thus, in accordance with the preferred embodiment of the invention, only low-cost conditioning processes, such as the addition of acids or stabilizers, are performed on the inlet flow to the entire installation. This minimizes the volume of material which must be treated by more costly procedures, i.e., only the comparatively low volume of concentrate from the first membrane separation unit is subjected to the more energy and chemical intensive treatments.

A process in accordance with the present invention is cost-effective and ecologically sound since the processing of the concentrate employs waste heat, spent steam and/or solar energy in simple and easily serviced forced evaporation apparatus. Further, through the use of a reactor with vapor recovery, an additional increase in product yield of the overall desalination installation can be achieved. The present invention also contemplates the use of waste heat for refinement of the concentrate in multi-stage evaporators, either alone or coupled with a drying process.

Another significant advantage of the present invention resides in the extensive in-process production of the chemicals necessary for the operation of the installation. This is a particularly significant improvement when the process is to be practiced in geographic areas where these chemicals may be obtained only with difficulty.

BRIEF DESCRIPTION OF THE DRAWING

The present invention may be better understood and its numerous objects and advantages will become apparent to those skilled in the art by reference to the accompanying drawing wherein:

FIG. 7 is a graphical representation of thermal disassociation of sodium bicarbonate produced during the practice of the process represented by FIG. 1; and FIG. 8 is a schematic diagram similar to FIG. 1 but employing multi-stage evaporation and evaporative drying for concentrate treatment.

DESCRIPTION OF THE PREFERRED EMBODIMENTS

Figure 1:
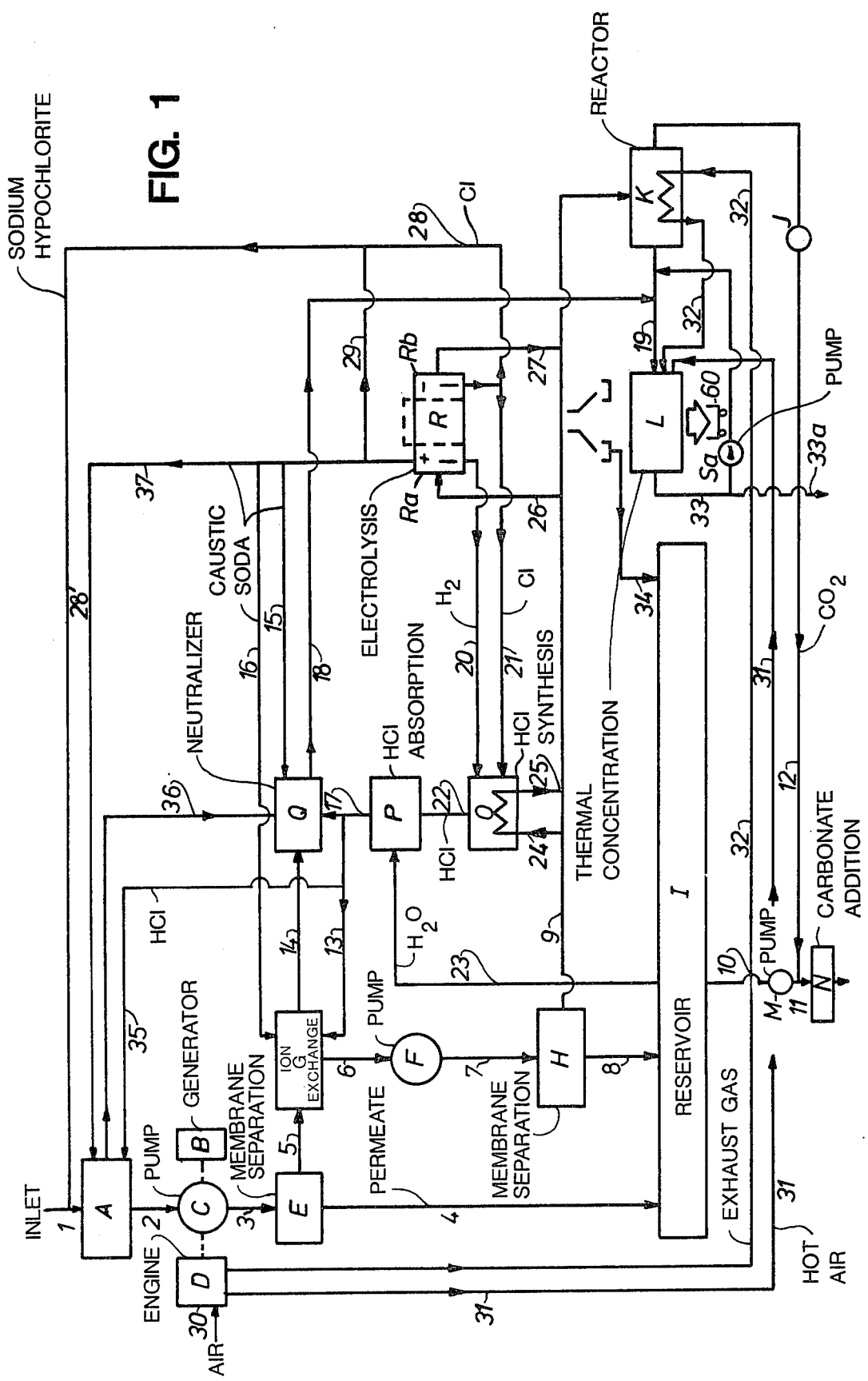
FIG. 1 is a schematic diagram of a desalination system in accordance with a preferred embodiment of the present invention, the embodiment of FIG. 1 employing forced evaporation to refine the concentrate of a pair of membrane separation stages.

Referring to FIG. 1, for purposes of explanation it may be presumed that raw water with a salt content in the brackish water range, i.e., 2,000–5,000 mg/l, is to be treated. This raw water is supplied to the desalination system via an inlet conduit 1. The received water will pass through a conditioning stage A. The discharge from conditioning stage A flows, via conduit 2, to a high pressure pump C. The discharge of pump C is delivered, via conduit 3, to a first membrane separation stage E. Pump C is driven by a power plant D which, in the embodiment being described, comprises a diesel engine. The drive shaft of engine D is also coupled to an electrical generator B. The generator B will be employed as the power source for further feed pumps within the installation.

The conditioning stage A is employed in the interest of impeding the formation of a coating on the membranes in the membrane separation stage E. In accordance with the present invention, the conditioning will normally consist of one or more dosing stations, ion exchangers operating on substreams or a combination of the foregoing. The conditioning stage A stabilizes, converts and or reduces the concentration of scale forming materials to a sufficient degree such that, in the first membrane separation stage E, a product yield is obtained with an order of magnitude of a minimum of 40-50% and a maximum of about 70%. The product derived from membrane separation stage E, i.e., the permeate, flows through a conduit 4 to a drinking and general purpose water reservoir I. As will be described in greater detail below, the permeate from stage E is mixed in reservoir I with the permeate of a second membrane separation stage H. As necessary, potable water is extracted from reservoir I via conduit 10 and supplied, under the pressure provided by a pump M, to the user.

The concentrate produced by membrane separation stage E is delivered via conduit 5 to a concentrate treatment stage G. The concentrate treatment stage G will consist of a special ion exchanger, filled with cation and/or anion exchanger material, or a thermally regenerable resin. The cation or anion concentration of scale formers is reduced in treatment stage G to such an extent that, by means of a further membrane separation stage H, the overall product yield of the desalination installation will be a minimum of 75% and a maximum of 95%.

The treated concentrate from concentrate treatment stage G is delivered, via high pressure pump F and conduits 6 and 7, to the above-mentioned second membrane separation stage H. The permeate produced in stage H flows, via conduit 8, into the above-mentioned reservoir I. The concentrate produced by separation stage H will be further concentrated, in the manner to be described below, by one of the devices depicted in FIGS. 2-6 or 8, the concentrate flowing through conduit 9 for such further treatment. This further treatment will, pursuant to FIGS. 2-6, comprise forced evaporation. Alternatively, the concentrate from membrane separation stage H will be delivered to an evaporator/dryer combination of the type depicted in FIG. 8.

In order for the products, i.e. the permeate, produced by the first and second membrane separation stages E and H to be suitable for use as drinking water, further treatment thereof is necessary. This further treatment comprises the dosing of the water pumped from reservoir I with carbon dioxide. Additionally, to achieve the desired carbonate hardness, it is desirable to either pass the water withdrawn from reservoir I through a filter of dolomite material or to add lime water or lime wash thereto in a treatment stage N. The carbon dioxide is typically injected upstream of stage N and is produced by the thermal disassociation of sodium bicarbonate which is formed in conditioning stage A or the concentrate treatment stage G. The source of the sodium bicarbonate is the carbonate hardness of the "raw" water and all of the sodium bicarbonate formed will be present in the concentrate of the second membrane separation stage H. The thermal disassociation of the sodium carbonate is performed, in a disassociation reactor K, using a weekly acid exchanger which picks up the mineral potassium ions from the concentrate and, in exchange, releases sodium to the water. Referring to FIG. 7, it may be seen that sodium bicarbonate is partially disassociated into carbon dioxide and sodium carbonate at a temperature as low as 40° C. The percentage of carbon dioxide which can be obtained from the concentrate of separation stage H by supplying heat thereto depends upon the degree of heating and the holding time of the concentrated salt solution in disassociation reactor K. The heat may be furnished to reactor K by means of flue gas or exhaust gas having temperatures in the range of 40°-100° C. with the heat being transferred to the concentrate by means of heat exchangers or heating pipes immersed therein. The carbon dioxide produced in reactor K is delivered, via conduit 12, to the water stream being withdrawn from reservoir I and thus is mixed with the water flowing in conduit 11. As noted above, the water withdrawn from reservoir I is also treated, in stage N, either by additional dosing of calcium hydrate in the form of lime water or lime wash or by passage through dolomite material.

It is to be noted that the reactor K which produces carbon dioxide from the concentrate of separation stage H also functions to preheat this concentrate prior to its delivery, via conduit 19, to a thermal concentration stage L.

As noted above, ion exchange processes may be used for conditioning of the raw water in conditioning stage A and to treat the concentrate from the first membrane separation stage in concentrate treatment stage G. The ion exchange devices will consist of either weak acid cation exchangers or a thermally regenerable resin. If a weak acid cation exchanger is employed, conventional lime technology is used but the apparatus is continuously operated. Thermally regenerable resin type exchangers can be used only continuously in the practice of the present invention. After loading to the attainable capacity, the exchanger used in the concentrate treatment stage G is regenerated with hydrochloric acid. This acid is supplied, via conduit 13, from a hydrochloric acid absorption unit P. The regenerated material from treatment stage G will pass, via conduit 14, to a neutralization stage Q where it is mixed with caustic soda produced in the manner to be described below. The caustic soda is supplied to neutralization stage Q via conduit 15. The caustic soda is also supplied, via conduit 16, to the concentrate treatment stage G. The neutralized regenerated material and eluate of the ion exchanger is delivered, via conduit 18, to the input of the thermal concentration stage L where it is mixed, in conduit 19, with the preheated concentrate from membrane separation stage H.

For regeneration of the ion exchanger in "raw" water conditioning stage A, hydrochloric acid is also delivered thereto via a branch conduit 35 which is connected to above-mentioned conduit 13. Similarly, caustic soda for conditioning will be supplied to conditioning stage A via conduit 37. The regenerated material from conditioning stage A, like the regenerated material from concentrate treatment stage G, is delivered via conduit 36 to the neutralization stage Q where it is processed with the regenerated material from stage G.

If a thermally regenerable exchange resin is used in either of "raw" water conditioning stage A or concentrate treatment stage G, the eluation of the resin, after exhaustion with calcium and magnesium, is carried out with hot water. This hot water is produced from cold water using waste heat from flue gas, exhaust gases or spent steam. The necessary adjustment of the exchange-active group of the resin with acid or lye can be performed in the manner described above with respect to the regeneration of a weak acid cation exchanger. The regenerated material produced can similarly be refined as described above.

The caustic soda supplied to stages G, Q and possibly A is derived from an electrolysis procedure. The electrolysis apparatus R includes separated cathode and anode regions indicated at R$a$ and R$b$. Concentrate from the second membrane separation stage H is supplied to the cathode region of the electrolysis apparatus R via branch conduit 26 connected to the main concentrate flow conduit 9. The concentrate exits the electrolysis apparatus via branch conduit 27 and is reinjected into the main concentrate stream flowing through conduit 9. In the known manner of operation of an electrolysis device, caustic soda and hydrogen are generated in the anode region R$a$. The caustic soda is, as discussed above, used for the conditioning of the ion exchangers of conditioning stage A and treatment stage G and for neutralization in stage Q. Chlorine will be generated in the region of the cathode of the electrolysis device during operation. The hydrogen and chlorine will be delivered, respectively via conduits 20 and 21, to a hydrogen chloride synthesis unit O. The hydrogen chloride synthesis unit comprises a combustion chamber and the exhaust product therefrom is hydrogen chloride which is conducted, via conduit 22, into the hydrochloric acid absorption unit P. Water withdrawn from reservoir I is also delivered, via conduit 23, to the hydrochloric acid absorption unit P where it functions as the absorption medium. The resulting hydrochloric acid, as noted above, is delivered via conduit 17 to the neutralization stage Q and, via conduits 13 and 35, to respective of the concentrate treatment stage G and the raw water conditioning stage A. Cooling of the hydrogen chloride synthesis unit 0 is achieved by passage therethrough, via branch conduits 24 and 25, of the concentrate from the second membrane separation stage H. This cooling also serves to preheat the concentrate thus reducing the energy requirements for the downstream reactor K and thermal concentration stage L.

A portion of the chlorine produced in electrolysis apparatus R is diverted into conduit 28. Similarly, a portion of the caustic soda produced in electrolysis device R is diverted from conduit 37 into conduit 29 and then mixed with the chlorine flowing in conduit 28. The resulting sodium hypochlorite is injected into the "raw" water upstream of the conditioning stage A. This sodium hypochlorite serves to impede biological growth in the desalination installation.

The thermal concentration stage L may be operated as a forced evaporator. When a diesel engine is employed as the power plant D for driving pump C, ambient air for cooling and combustion is drawn into the apparatus via conduit 30. The heated cooling air is subsequently delivered, via conduit 31, to the forced evaporator L. Similarly, the exhaust gases from the diesel engine are conducted to evaporator L via conduit 32. As an alternative, the exhaust gases can be passed through a heat exchanger in a disassociation reactor K prior to delivery to the evaporator L. A concentrated solution of comparatively low volume is discharged from evaporator L via conduit 33 for further refining.

When the thermal concentration stage L is a forced evaporation unit with vapor recovery, as represented in FIG. 1, the vapor condensate is collected and delivered, via conduit 34, to the reservoir I. In order to improve the efficiency of the evaporation apparatus, it is possible to return concentrated solution from the discharge conduit 33 to the inlet 19 by means of a recirculation pump S$a$.

Figure 2:
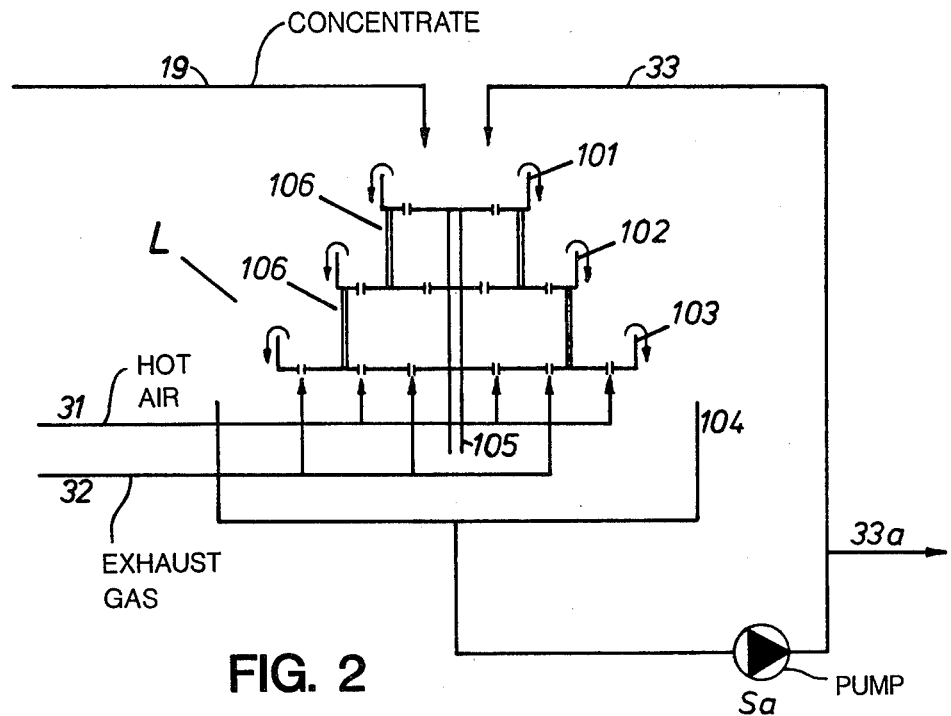
FIGS. 2-6 are schematic diagrams depicting different embodiments of apparatus for treatment of the concentrate of the apparatus of FIG. 1 by means of forced evaporation.

With reference now to FIG. 2, a forced evaporation apparatus suitable for use as the thermal concentration stage L is shown schematically. This forced evaporation apparatus is in the form of a pyramidal cascade. The concentrate is supplied, via conduit 19, to the head or top of the cascade which is in the form of a series of shallow basins comprised of wood or plastic. The concentrate flows over the rim of the head basin 101 and seeps into the next lower basin 102 and the overflow from basin 102 will likewise flow into basin 103. The basins are mounted on a central support 105 which consists of a continuous plate or a number of shafts of wood, metal or plastic. The basins are connected to one another by lateral stays 106. A drainage system of perforated metal or plastic tubes is positioned below basin 103 and above the fluid level of a lower-most collector basin or reservoir 104. The hot gases supplied via conduits 31 and 32 are introduced into this drainage system and thus flow upwardly in counter flowing relationship to the concentrate. The above described apparatus is characterized by large area heat exchange surfaces and thus the heat of the counter flowing gases causes a large amount of evaporation of water from the concentrated solution delivered to the apparatus. The entire forced evaporation apparatus is also preferrably placed to receive direct solar radiation so that the solution distributed in a thin layer in the basins of the cascade and seeping downwardly is further heated and the evaporation thus reinforced. Further improvement of operation may be achieved by recirculation of at least a portion of the solution from the lower-most collecting basin 104 and returning the solution, under the influence of pump S$a$, to the head of the cascade. This recirculation results in a lengthening of the time the solution is in the evaporator as well as increasing the average temperature of the solution entering the head 101 of the evaporator.

Figure 3:
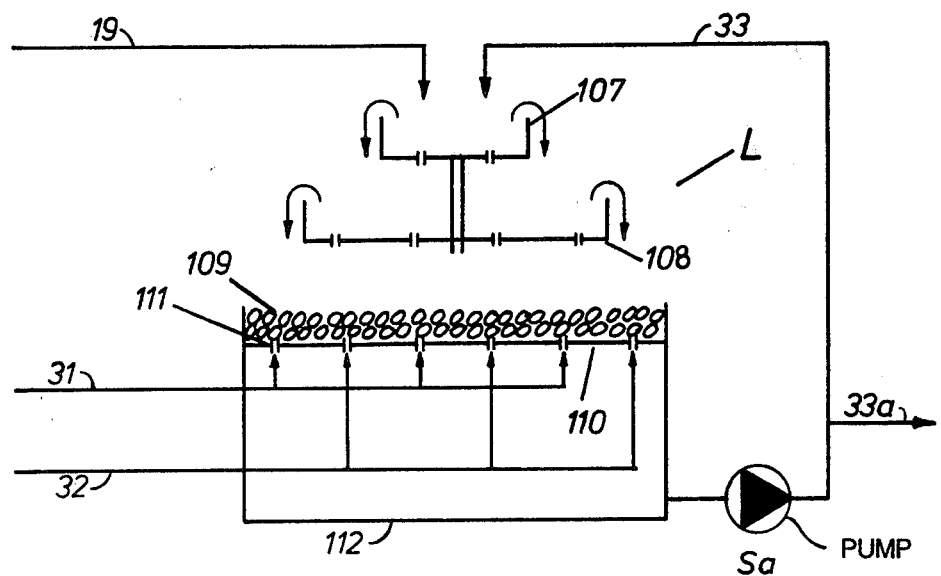

A modified form of cascade type forced evaporation apparatus is depicted in FIG. 3. In the FIG. 3 embodiment, which has the same basic construction as the FIG. 2 embodiment, the concentrate is delivered to the head 107 of the cascade. Concentrate overflowing from head 107 will be collected in a second, larger basin 108. As a distinction from the FIG. 2 apparatus, in the FIG. 3 apparatus the overflow from basin 108 will flow into a "reservoir" filled with large, irregularly shaped stones 109 supported on a central grid 110. The concentrate will seep downwardly through the stones 109 while the hot gases pass upwardly through the stones. The solution will collect in a bottom basin 112 and may be recirculated by means of pump S$a$.

Figure 4:
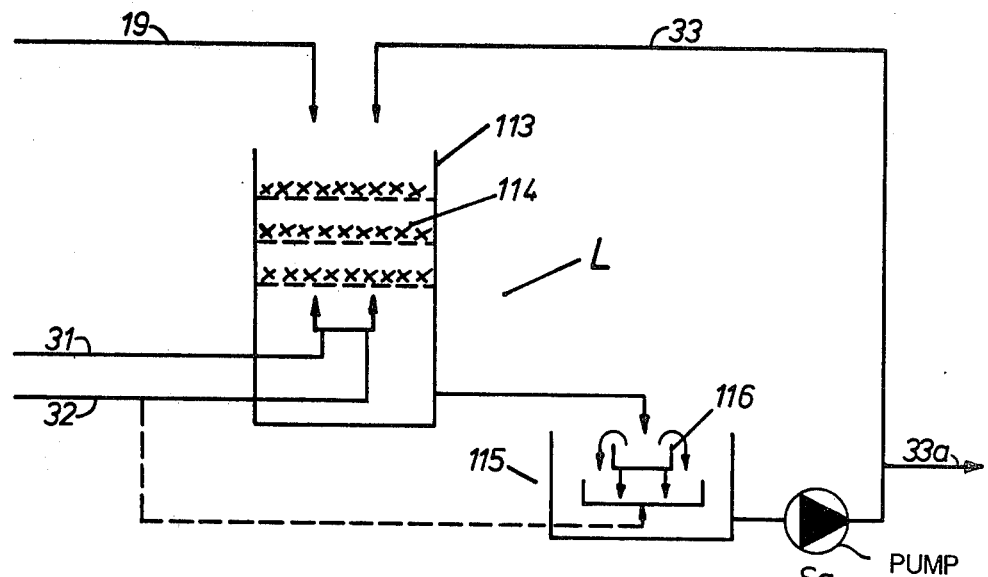

FIG. 4 schematically depicts a two-stage forced evaporation apparatus. The first stage of this apparatus comprises a reactor 113 which is provided with inserts 114 in the form of perforated base plates or screens. The concentrate will flow downwardly through these plates or screens in counter-flowing relationship to the hot gases. In the interest of increasing the surface area of the evaporator, variously formed filler bodies can be supported on the base plates or screens. The preconcentrated solution is delivered from the first stage of the evaporator to a second stage 115 which may be of the pyramidal type described above and which will be equipped with removable inserts 116. The two-stage installation operates by concentrating the solution in the first stage to a degree at which as yet no precipitation or crystallization of the solids will occur. Thus, the precipitation of solids first occurs in the second stage where the inserts are easily replaced when they have become coated with solid materials. Accordingly, the supply of hot gases must be controlled to insure that the gas or gas mixture delivered to the first stage reactor 113 will produce a temperature sufficiently low to prevent solidification and crystallization. The second stage reactor 115 may, in some installations, be operated solely with solar energy thus eliminating the need of the delivery of the hot gases thereto.

Figure 5:
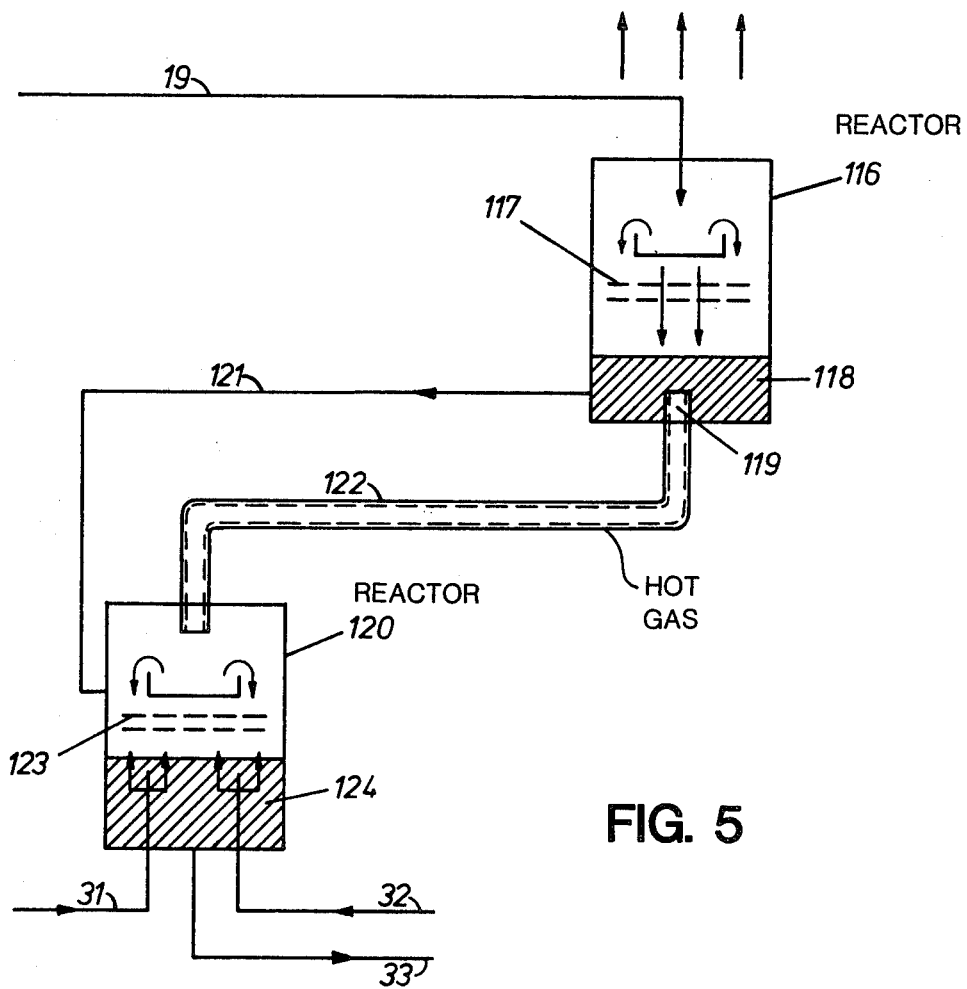

FIG. 5 shows another two-stage evaporator wherein the high-salinity solution is delivered to the first stage reactor 116 and flows downwardly through a series of perforated plates or other appropriate fixtures 117 into a receiver 118. The fluid level in the receiver 118 is adjusted such that it covers a gas distribution tube 119. The pre-concentrated solution from the first stage reactor 116 is delivered, via conduit 121, to the second stage reactor 120. The heated gases are supplied directly to reactor 120 via heat exchange conduits which pass through the receiver portion 124 thereof. The pre-concentrated solution flows in free fall through the evaporator plates 123 of the second stage reactor 120 into the receiver section 124 and, subsequently, is discharged via conduit 33 for refining. The second stage reactor 120 is a closed vessel and thus the hot gases will exit the reactor via conduit 122 and be delivered to the first stage reactor 116. The reactor 116 will have a open top whereby the used gases may be exhausted to the atmosphere after having performed their heating function in second and first stage reactors 120 and 116.

Figure 6:
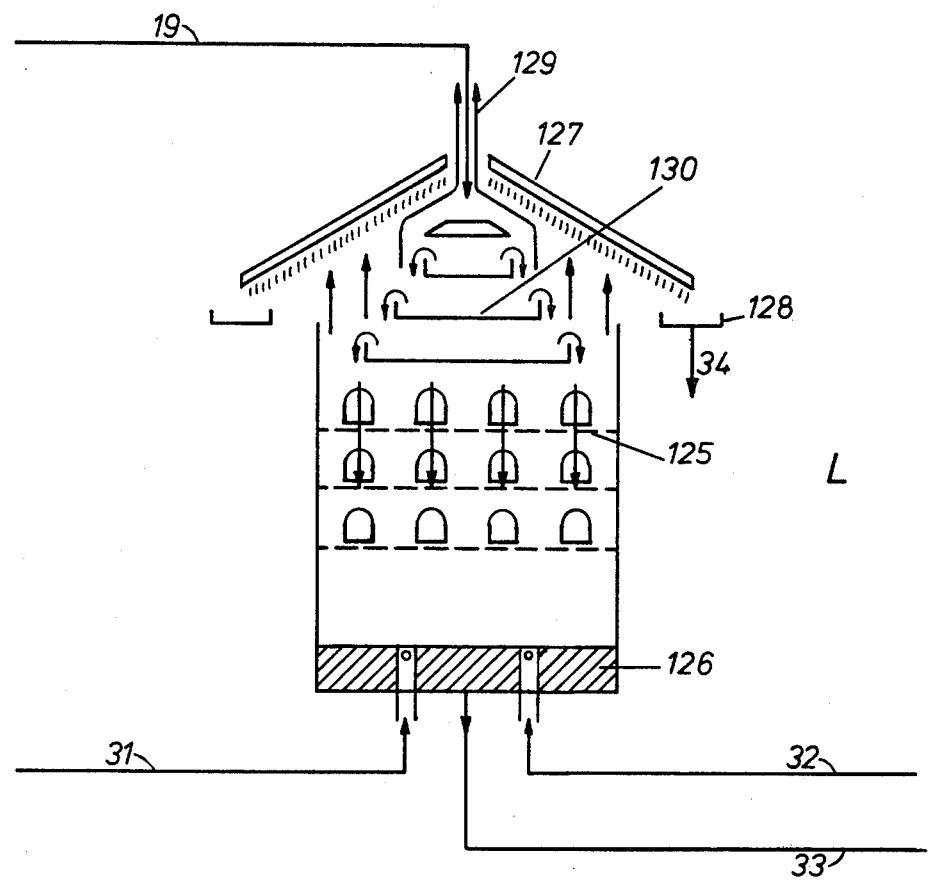

The further evaporator embodiment depicted in FIG. 6 includes a cascade system 130 to which the brine is delivered via conduit 19. The cascade system 130, like the apparatus described above, consists of a series of flat basins of increasing size. The solution which overflows the base of the cascade system will flow downwardly through inserts 125 which may be perforated plates or screens with or without filler materials supported thereon. The gas flow will, of course, be in the opposite direction to the flow of liquid. The fluid collected in the base or receiver portion 126 of the evaporator will subsequently be discharged via conduit 33 for refining. The receiver section 126 is configured, and the fluid level therein controlled, such that the liquid level will cover the hot gas inlet tubes. Vapors formed by evaporation within the apparatus of FIG. 6 will condense on an upper ring-shaped sloping cover 127. The cover 127 will be cooled with ambient air, by forced air supplied by means of a blower or through the use of tubes through which a coolant is circulated. The condensate will be collected in channels 128 placed under the lower edge of the cover 127 and subsequently, via conduit 34, delivered to reservoir I. The exhaust gas, which contains a relatively small amount of water, will leave the evaporator through a vapor duct 129 which is attached to the center of the cover 127.

FIG. 8 depicts a system similar to that of FIG. 1 wherein a combination of an evaporator and drying unit is employed as an alternative to the above-discussed forced evaporation in the thermal concentration stage L. Thus, in the FIG. 8 embodiment concentrate from the first membrane separation stage E is delivered via conduit 5 to the concentrate treatment stage G. The treated concentrate is pumped, by means of a feed pump F, throught conduits 40, 41 and 42 to the second membrane separation stage H. If the feed pump F is driven by a second diesel engine DD, the waste heat resulting from the cooling of this engine is used for pre-heating the concentrate. Advantageously, since the diesel engine will typically be liquid cooled, the discharge conduit 40 of treatment stage G will be coupled to the radiator of the diesel plant DD. In the case of air cooling, an additional gas-liquid heat exchanger is inserted in conduit 40.

The membrane separation stage H produces, from the pre-heated concentrate delivered thereto via conduits 40, 41 and 42, a low salinity permeate and high salinity concentrate. The permeate is delivered directly, via conduit 8, to reservoir I. The concentrate is delivered, via conduits 43 and 44, to a heat exchanger X and, via conduit 45, subsequently to a heat exchanger Y. The concentrate exiting heat exchanger Y, through the use of a pump Z if necessary, will be delivered via conduits 46 and 47 to a multi-stage evaporator U.

It is to be noted that an energy recovery unit W is connected between conduits 43 and 44. The recovery unit W is mechanically coupled either to the high pressure pump F, a vacuum pump CC, the concentrate pump Z or the brine pump T. The energy recovery unit W may comprise a generator which produces electrical power which can be employed to supply the requisite current for operating some or all of the aforementioned pumps, the electrical connection to the pumps being indicated by XX. Electrical power may also be produced by coupling a generator BB to the diesel plant DD. The heat exchangers X and Y function to pre-heat the concentrate before it entires the multi-stage evaporator U. To this end, heat exchanger X is supplied with vapor from the multi-stage evaporator U via conduit 48 and with vapor from a drum dryer S via conduits 56 and 48. Heat exchanger Y receives the exhaust gases from the diesel engine DD via conduits 49 and 50, as well as a portion of the exhaust 52 from the drum dryer S. Prior to delivery to heat exchanger Y, the diesel engine exhaust will be routed through a brine pre-heater V in the multi-stage evaporator U. The exhaust gases released to the ambient environment after passage through heat exchange Y will typically have a temperature in the range of 110°–160° C. A further portion of the engine exhaust is diverted, upstream of heat exchanger Y, into conduit 51 and delivered to the drum dryer S. The cooled gas exiting drum dryer S through conduit 52 may be mixed with the hot exhaust gases in conduit 49 in order to recover the residual heat.

The pre-heated concentrate in conduit 47 is further concentrated in the multi-stage evaporator U and the brine thus formed is fed, through conduits 53 and 54, to the dryer S by means of the brine pump T. The resulting low salinity product of the multi-stage evaporator U is delivered, via conduit 55, to reservoir I. Small quantities of remaining vapor exiting the multi-stage evaporator U are mixed with the vapors exiting drum dryer S via conduit 56 and employed as a source of thermal energy for heat exchanger X. This flow of hot vapor is produced as a result of the operation of the vacuum pump CC connected in conduit 57 downstream of heat exchanger X. As an alternative to the use of a vacuum pump, an ejector driven by spent steam may be employed. The vapors condensed in heat exchanger X will flow, via conduits 57 and 58, into reservoir I. Should this condensate have a salt content which precludes its use as drinking water, it can be returned via conduit 59 to the concentrate flow conduit 5.

The water stored in reservoir I, i.e., the permeate from membrane separation stages E and H, the condensate from multi-stage evaporator U and the condensed vapors from dryer S, is pumped to the user in the manner described above in the discussion of FIG. 1. The brine from multi-stage evaporator U is pumped by the brine pump T through conduits 53 and 54 to the dryer S. In dryer S the brine is further concentrated in an evaporators section and then converted to a dry substance in the crystallization and drying section after removal of residual moisture. This dry material is collected in suitable containers 60 and transported to a suitable disposal site or for further processing. The solid waste material produced in the forced evaporation stage L of FIG. 1 is similarly processed.

If spent steam and flue gas from a power plant are available, the high pressure pump F may be coupled to a turbine driven by the steam. After exiting the turbine the steam will be used for the heating of evaporator U and dryer S. The steam can also be used, together with the vapors from thermal processing stages U and S, for pre-heating of the concentrate of membrane separation stage H in heat exchanger X. Any available flue gas may be handled in the same manner as discussed above with respect to the exhaust of the diesel engine DD, i.e., such flue gas may be used in heat exchanger Y before pre-heating the concentrate from membrane separation stage H and may also be used for the heating of the drum dryer S and the brine in pre-heater V of evaporator U.

The operation of the concentrate treatment stage G using a weak acid cation exchanger for removal of bivalent ions, as schematically shown in FIG. 8, has been described above in the discussion of FIG. 1.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A water treatment process comprising the steps of:
conditioning inflowing raw water to reduce scale forming materials therein;
pressurizing the conditioned water;
subjecting the pressurized water to a first membrane separation process to produce a permeate and a concentrate;
treating the concentrate from the first membrane separation process to reduce scale forming materials therein;
pressurizing the treated concentrate;
subjecting the pressurized concentrate to a second membrane separation process to produce a permeate and a concentrate;
subjecting the concentrate from the second membrane separation process to a thermal concentration process to produce condensate and carbon dioxide;
mixing the permeate produced in the first and second membrane separation process with the condensate from the thermal concentration process; and
injecting carbon dioxide produced during the thermal concentration process into the said mixture of permeate and condensate to produce a potable water.

2. The process of claim 1 wherein said membrane separation processes comprise reverse osmosis.

3. The process of claim 1 wherein said membrane separation processes comprise electrodialysis.

4. The processes of claims 1, 2 or 3 wherein the step of conditioning the raw water comprises:
subjecting the raw water to an ion exchange process.

5. The process of claim 4 wherein the step of treating the concentrate from the first membrane separation process comprises:
subjecting the concentrate to an ion exchange process.

6. The process of claim 5 further comprising:
subjecting at least a portion of the concentrate from the second membrane separation process to electrolysis to produce a hydrogen gas, chlorine gas and caustic soda;
employing the hydrogen and chlorine gases produced in the electrolysis step and potable water to synthesize hydrochloric acid; and
employing the hydrochloric acid and caustic soda to condition ion exchangers employed in the raw water conditioning step and the concentrate treatment step.

7. The process of claim 4 wherein the step of treating the concentrate from the first membrane separation process comprises:
adding chemicals thereto to cause precipitation of scale forming compounds.

8. The process of claim 4 further comprising:
subjecting at least a portion of the concentrate from the second membrane separation process to electrolysis to produce a hydrogen gas, chlorine gas and caustic soda;
employing the hydrogen and chlorine gases produced in the electrolysis step and potable water to synthesize hydrochloric acid; and
employing the hydrochloric acid and caustic soda to condition ion exchangers employed in the raw water conditioning step.

9. The processes of claims 1, 2 or 3 wherein the step of conditioning the raw water comprises the addition of an acid and stabilizer thereto.

10. The process of claim 9 wherein the step of treating the concentrate from the first membrane separation process comprises:
subjecting the concentrate to an ion exchange process.

11. The process of claim 5 wherein the step of treating the concentrate from the first membrane separation process comprises:
adding chemicals thereto to cause precipitation of scale forming compounds.

12. The processes of claims 1, 2 and 3 wherein the step of treating the concentrate from the first membrane separation process comprises:
subjecting the concentrate to an ion exchange process.

13. The process of claim 12 further comprising:

subjecting at least a portion of the concentrate from the second membrane separation process to electrolysis to produce a hydrogen gas, chlorine gas and caustic soda;

employing the hydrogen and chlorine gases produced in the electrolysis step and potable water to synthesize hydrochloric acid; and employing the hydrochloric acid and caustic soda to condition ion exchangers employed in the concentrate treatment step.

14. The process of claims 1, 2 or 3 wherein the step of treating the concentrate from the first membrane separation process comprises:

adding chemicals thereto to cause precipitation of scale forming compounds.

15. The process of claim 1 wherein the step of conditioning the raw water comprises selectively removing bivalent ions while permitting monovalent ions to pass.

16. The process of claim 15 wherein the step of selectively removing the bivalent ions comprises immersing a thermally regenerable ion exchange resin in a raw water intake.

17. The process of claim 1 wherein the step of treating the concentrate from the first membrane separation process comprises selectively removing bivalent ions from the concentrate.

18. The process of claim 17 wherein the step of selectively removing the bivalent ions comprises immersing a thermally regenerable ion exchange resin in a raw water intake.

19. The process of claim 1 wherein said first membrane separation process is operated with a pressure in the range of 20–40 bar and has a salt pass rate in the range of 5–20% and wherein said step of pressurizing the treated concentrate comprises:

pressurizing the treated concentrate from the first membrane separation process to a level which will cause said second membrane separation process to operate with a pressure in the range of 50–100 bar and a salt pass rate in the range of 0.5–5%.

20. The process of claim 19 wherein the step of treating the concentrate from the first membrane separation process comprises:

subjecting the concentrate to an ion exchange process.

21. The process of claim 19 wherein the step of treating the concentrate from the first membrane separation process comprises:

addition of chemicals thereto to cause precipitation of scale forming compounds.

22. The process of claim 1 wherein the step of subjecting the concentrate from the second membrane separation process to a thermal concentration process comprises:

heating the concentrate to a temperature of at least 40° C. to cause the production of carbon dioxide.

23. The process of claim 1 further comprising:

subjecting at least a portion of the concentrate from the second membrane separation process to electrolysis to produce a hydrogen gas, chlorine gas and caustic soda;

employing the hydrogen and chlorine gases produced in the electrolysis step and potable water to synthesize hydrochloric acid; and employing the hydrochloric acid and caustic soda to condition ion exchangers employed in the raw water conditioning step.

24. The process of claim 23 wherein the step of subjecting the concentrate from the second membrane separation process to a thermal concentration process comprises:

delivering the concentrate to a forced evaporation apparatus.

25. The process of claim 23 wherein the step of subjecting the concentrate from the second membrane separation process to a thermal concentration process comprises:

delivering the concentrate to the first stage of a two-stage cascaded evaporator to cause the removal of water therefrom without the formation of solids;

delivering the concentrate from the first evaporator to a second evaporator wherein solids are formed; and separately providing thermal energy to said evaporator stages in the form of heated gases.

26. The process of claim 23 wherein the step of subjecting the concentrate from the second membrane separation process to a thermal concentration process comprises:

pre-heating the concentrate;

delivering the pre-heated concentrate to a multi-stage evaporator, the evaporator producing the condensate.

27. The process of claim 26 wherein the step of subjecting the concentrate from the second membrane separation process to a thermal concentration process further includes:

delivering the concentrate from the multi-stage evaporator to a dryer.

* * * * *